N. LAURENCY.
GEARING FOR SELF ACTING MULES.
APPLICATION FILED AUG. 21, 1919.
1,330,880.
Patented Feb. 17, 1920.
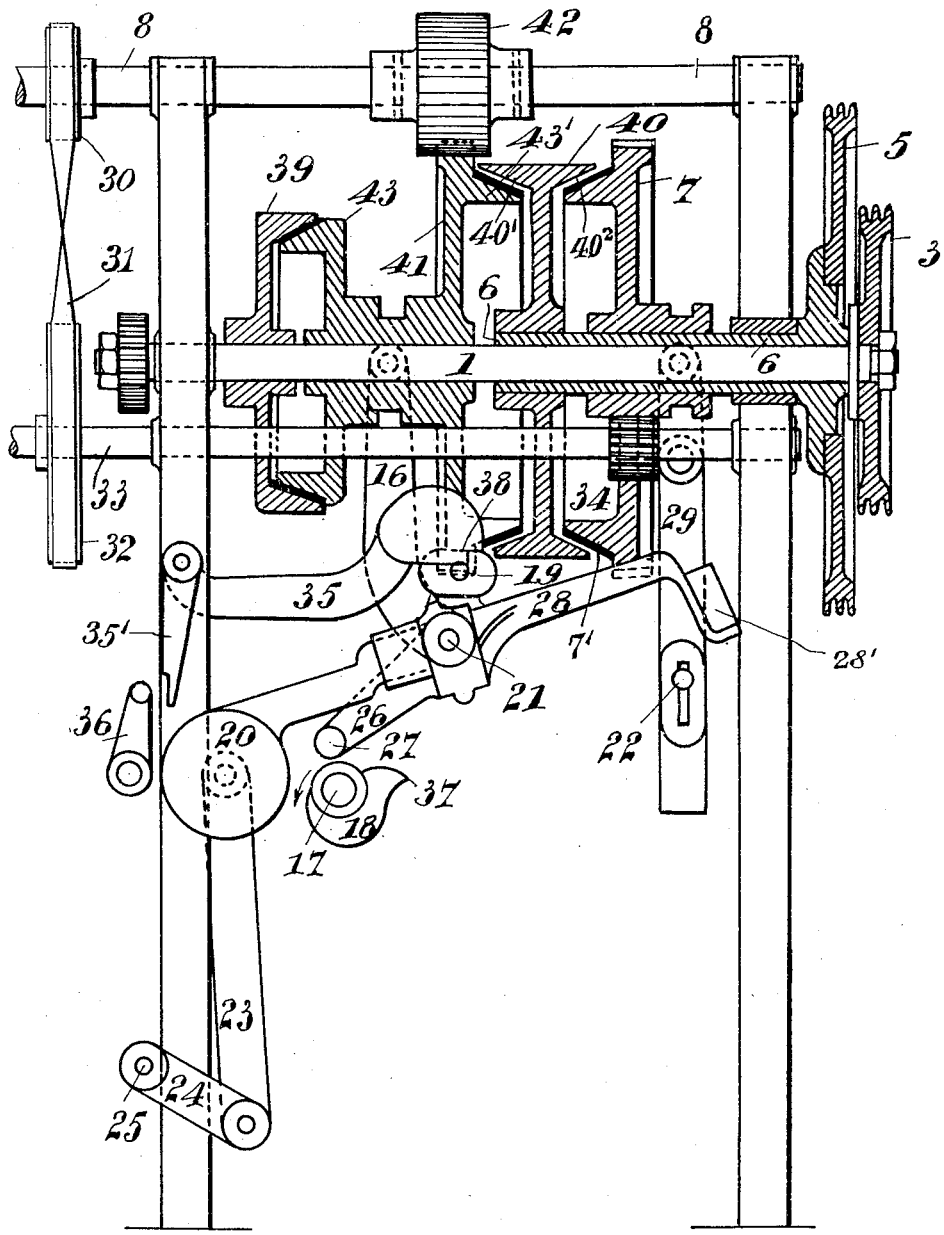
Inventor:
Nicolas Laurency
By [signature]
Attorney.

UNITED STATES PATENT OFFICE.

NICOLAS LAURENCY, OF DOLHAIN, BELGIUM.

GEARING FOR SELF-ACTING MULES.

1,330,880.   Specification of Letters Patent.   Patented Feb. 17, 1920.

Application filed August 21, 1919. Serial No. 319,007.

*To all whom it may concern:*

Be it known that I, NICOLAS LAURENCY, a subject of the King of the Belgians, residing at 15 Avenue David, Dolhain, in the Province of Liege, Kingdom of Belgium, have invented a new and useful Improvement in Gearing for Self-Acting Mules; and I do hereby declare the following to be a full, clear, and exact description of the same.

The present invention relates to gearing for self-acting mules of the type having a plurality of different speeds and a countershaft drive, the invention having for its object the provision of an improved gearing in which the usual shiftable belting is replaced by a system of friction clutches and pulleys. This system primarily involves an improved rotary power-transmission element which is mounted on the main shaft and is shiftable in one direction or the other to alternatively drive the high and low speed pulleys which are utilized in turn, to respectively drive the high and low speed whirls, the transmission element itself being positively driven directly from the countershaft.

The accompanying drawing shows in vertical section one form which the improved gearing may take in practice.

Referring more particularly to the drawing, 1 indicates the usual main shaft of the mule, and 3 and 5 the low and high speed whirls carried thereby. The low speed whirl 3 is fixed directly to one end of the shaft, but the high speed whirl 5 is secured to a long sleeve 6 which is loose on said shaft to rotate relatively thereto. Shaft 1 also carries a pulley 39 which is fixed to it and which takes the place of the usual low speed twist pulley, this pulley 39 being formed with an interior conical clutch face for coöperation with a conical clutch member 43. The latter forms one part of the improved rotary power transmission element previously mentioned, said element also comprising an oppositely-beveled annular clutch member 43' of larger diameter which has combined with it a gear 41, the parts 43 and 41 being spaced from each other and the transmission element being loose on the shaft and shiftable as a whole in one direction or the other along the same by means of a fork or lever 16 in the manner hereinafter described. Gear 41 meshes with and is driven by a pinion 42 fast on the countershaft 8, which latter is suitably connected to an electric motor or other source of power (not shown).

On the end of sleeve 6 adjacent the clutch member 43' there is fastened the high-speed pulley 40 which, as shown, has two internal, oppositely-beveled clutch faces 40' and 40², for respective coöperation with the clutch member 43' and with a similar (but oppositely facing) clutch member 7', the latter being integrally connected to the backing-off gear 7 which is slidable loosely on said sleeve. Hence it follows that the double clutch pulley 40 may be engaged alternatively with the clutch members 43' and 7', or may occupy an intermediate position in which it is free of both said members; the clutch member 43 being disengaged from pulley 39 when members 43' and 40' are engaged, and vice versa. The backing-off gear 7 meshes with a pinion 34 mounted on a horizontal shaft 33 which is parallel with the countershaft 8; and both this pinion and the pinion 42 are of sufficient width to remain in mesh with their respective gears 7 and 41 during the shifting movements of the clutch members 7' and 43'. The shafts 8 and 33 are connected by means of a suitable transmission device which may consist, as shown, of a belt 31 passing over pulleys 30 and 32 on said shafts, so that the rotation of shaft 8 will be transmitted to the shaft 33 and thence to the gear 7 to effect the backing-off operation, at which time the clutch parts 7' and 40² will be coupled as understood.

The fork or lever 16, which is utilized to shift the main power transmission element 43—41—43', forms part of, or is connected to a controlling lever 28 which also carries an arm 26 and is suitably supported at 21 in the framework, said arm 26 being inclined downwardly toward a cam 18 which is mounted on a horizontal shaft 17 driven in any desired manner from the shaft 33, while the fork arm 16 projects upwardly. The controller 28 carries a counter-weight 20 at one end thereof, which tends to hold it in the position represented, in which position the clutch member 43 is engaged with the low speed clutch pulley 39. Arm 26 carries at its free end a lateral roller or projection 27 which is disposed in the path of a nose 37 provided on cam 18, the arrangement being such that during the rotation of the cam its nose will engage and lift said roller. This results in the arm 26 and the lever 28 being rocked in a clockwise direction, the fork 16 moving the clutch element 43—41—43′ bodily toward the two-way, high speed clutch pulley 40 in order to couple the latter and uncouple the low speed pulley 39.

As the counterweight 20 would tend to restore the parts to their former position as soon as the high part of nose 37 of the cam passes beyond roller 27, means is provided for locking the controlling lever in its raised position, so as to maintain the high speed pulley in clutch for a given period. Such locking means may comprise, as illustrated, a lever 35 formed with a notch 38 designed to engage a pin 19 on fork 16 when the counterweight has been raised, thereby preventing the return or downward movement of the weight. Release of the parts is effected by means of a rocker 36, adapted to strike against an arm 35′ which is rigidly connected to the notched locking lever 35, said lever being caused to move upward and thereby withdraw its notch 38 from pin 19. The rocker 36 is operated at a given moment by the usual twist counter (not shown), and the latter thus determines the duration of the period for which the locking action and the high speed drive continue.

Movement of the controller for the purpose of effecting coupling of the high-speed pulley may also be produced by the usual carriage (not shown) of the machine which serves to operate the shaft 25, the latter having secured to it a lever or arm 24 which has a link connection 23 with the counterweight 20.

The shifting movements of the backing-off gear 7 are effected by means of a fork or lever 29 which may be operated in any desired way to couple or uncouple its clutch member 7′ to or from the clutch face 40² of the high speed pulley 40, its rotation being effected from the countershaft 8 through the intermediary of the parts 30, 31, 32, 33 and 34. Lever 29 is provided with a lateral pin or roller 22 which is engaged by the bent end 28′ of the controller 28 whereby said lever 29 is locked against operation.

Operation takes place substantially as follows, starting with the parts in the position represented which is their position at the beginning of the outward run of the carriage:—Power is transmitted through the countershaft 8 and its pinion 42 to the gear member 41 of the main clutch element, the clutch member 43 of which is engaged at that time with the clutch face of the low speed pulley 39, so that the latter is positively driven and, in turn, drives the main shaft 1 and the low speed whirl 3. At the end of the outward movement of the carriage, the cam shaft 17 makes a half-revolution, during which the nose or tip 37 of its cam 18 engages the roller 27 on arm 26 and thereby raises the counterweight 20 and rocks lever 28, said lever being thereupon locked in actuated position by the notched lever 35 which engages pin 19 on fork 16. The rocking movement of the controlling lever 28 has the effect of swinging fork 16 clockwise or toward the right, which results in the main clutch element being shifted in the same direction so as to uncouple the low speed pulley 39 and couple the high speed pulley 40 consequent upon the engagement of the clutch faces or members 43′ and 40′. The pulley 40 thereupon commences to rotate, its movement being transmitted through sleeve 6 to the high speed whirl 5. At the proper moment, the twist counter rocks the release arm 36 clockwise, said arm being thereby caused to rock in a counter-clockwise direction the two-armed lever 35′—35 which thereupon disengages pin 19. Counterweight 20 tends to immediately restore the parts to normal position, but is prevented by the engagement of roller 27 with the intermediate part of cam 18, so that the main clutch element merely assumes a neutral position in which it is uncoupled from both pulleys.

Backing-off then takes place, the rotation of the countershaft 8 being transmitted through the parts 30, 31 and 32 to the shaft 33, and thence through pinion 34 to gear 7, which at that time is coupled to the high speed pulley 40 by the operation of the lever 29, which effects the engagement of the two clutch faces or members 7″ and 40², the pulley 40 transmitting its rotary movement through sleeve 6 to the high speed whirl 5. When the carriage has run in, the cam shaft 17 makes a second half-revolution, thus returning cam 18 to the position illustrated. This completely disengages said cam from the roller 26, and permits the counterweighted controlling lever to assume its initial position, during which movement it reengages the clutch member 43 of the main clutch element with the low speed pulley 39. If the high speed is to come into operation before the carriage has completed its outward run,—i. e., before the cam has made its first half-revolution, the shaft 25 is operated to raise the counterweighted controlling lever through the intermediary of the arm 24 and link 23, said shaft receiving its motion from the carriage, as has been stated.

I claim as my invention:—

1. In a system of multi-speed power transmission, the combination of a shaft; high and low speed pulleys thereon; a rotary power transmission element shiftably mounted on said shaft between said pulleys for alternative engagement therewith; a driving shaft; means on the driving shaft in constant driving engagement with the transmission element; means normally tending to move said transmission element in one direction along the first named shaft to bring it into driving engagement with one pulley; and means for automatically and periodically shifting said transmission element in the opposite direction to bring it into driving engagement with the other pulley.

2. In a system of multi-speed power transmission, the combination of a shaft; high and low speed pulleys thereon; a rotary power transmission element shiftably mounted on said shaft between said pulleys for alternative engagement therewith; a driving shaft; means on the driving shaft in constant driving engagement with the transmission element; means normally tending to move said transmission element in one direction along the first named shaft to bring it into driving engagement with one pulley; means for automatically and periodically shifting said transmission element in the opposite direction to bring it into driving engagement with the other pulley; means for locking said transmission element in actuated position; and automatic means for releasing said locking means.

3. In a system of multi-speed power transmission, the combination of a shaft; high and low speed pulleys thereon; a rotary power transmission element shiftably mounted on said shaft between said pulleys for alternative engagement therewith; a driving shaft; means on the driving shaft in constant driving engagement with the transmission element; a lever connected to shift said transmission element; means for normally holding said lever in a position in which the transmission element is engaged with one pulley; and means adapted to automatically and periodically rock said lever into a position to disengage said transmission element from said pulley and engage with the other pulley.

4. In a system of multi-speed power transmission, the combination of a shaft; high and low speed pulleys thereon; a rotary power transmission element shiftably mounted on said shaft between said pulleys for alternative engagement therewith; a driving shaft; means on the driving shaft in constant driving engagement with the transmission element; a lever connected to shift said transmission element; means for normally holding said lever in a position in which the transmission element is engaged with one pulley; an actuating member on said lever; and a cam engageable with said member to rock said lever into a position to disconnect said transmission element from said pulley and connect it with the other pulley.

5. In a system of multi-speed power transmission, the combination of a shaft; high and low speed pulleys thereon; a rotary power transmission element shiftably mounted on said shaft between said pulleys for alternative engagement therewith; a driving shaft; means on the driving shaft in constant driving engagement with the transmission element; a lever connected to shift said transmission element; means for normally holding said lever in a position in which the transmission element is engaged with one pulley; an actuating member on said lever; means coöperative with said member for rocking said lever into a position in which it disconnects said transmission element from said pulley and connects it with the other pulley; a locking element engageable with said lever to hold it in the last named position; and automatic releasing means for the locking element.

6. In a system of multi-speed power transmission, the combination of a shaft; high and low speed pulleys thereon; a rotary power transmission element shiftably mounted on said shaft between said pulleys for alternative engagement therewith; a driving shaft; means on the driving shaft in constant driving engagement with the transmission element; a lever connected to shift said transmission element; means for normally holding said lever in a position in which the transmission element is engaged with one pulley; an actuating member on said lever; means coöperative with said member for rocking said lever into a position in which it disconnects said transmission element from said pulley and connects it with the other pulley; a bell crank lever having a locking arm engageable with said rocking lever to hold it in the last named position; and a releasing member automatically engageable with the other arm of the bell crank lever.

7. In a system of multi-speed power transmission, the combination of a shaft; high and low speed pulleys thereon; a rotary power transmission element shiftably mounted on said shaft between said pulleys for alternative engagement therewith; a driving shaft; means on the driving shaft in constant driving engagement with the transmission element; a lever connected to shift said transmission element; means for normally holding said lever in a position in which the transmission element is engaged with one pulley; an actuating member on said lever; a cam coöperative with said member to rock said lever into a position in which it disconnects said transmission element from said pulley and connects it with the other pulley; a locking element engageable with said lever to hold it in the last named position; and automatic releasing means for the locking element.

8. In a system of multi-speed power transmission, the combination of a shaft; high and low speed pulleys thereon; a rotary power transmission element shiftably mounted on said shaft between said pulleys for alternative engagement therewith; a driving shaft; means on the driving shaft in constant driving engagement with the transmission element; a lever connected to shift said transmission element; means for normally holding said lever in a position in which the transmission element is engaged with one pulley; an actuating member on said lever; a cam coöperative with said member to rock said lever into a position in which it disconnects said transmission element from said pulley and connects it with the other pulley; a bell crank lever having a locking arm engageable with said rocking lever to hold it in the last named position; and a releasing member automatically engageable with the other arm of the bell crank lever.

In testimony whereof, I have signed my name to this specification in the presence of two subscribing witnesses.

NICOLAS LAURENCY.

Witnesses:
  A. WINANY,
  DEFAYT MAURICE.